(12) United States Patent
Chandrashekar et al.

(10) Patent No.: US 12,309,454 B2
(45) Date of Patent: May 20, 2025

(54) METHODS AND SYSTEMS FOR GENERATING A SUMMARY OF CONTENT BASED ON A CO-RELATION GRAPH

(71) Applicant: Adeia Guides Inc., San Jose, CA (US)

(72) Inventors: Padmassri Chandrashekar, Karnataka (IN); Daina Emmanuel, Karnataka (IN); Harshavardhan Kalathuru, Andhra Pradesh (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 17/383,226

(22) Filed: Jul. 22, 2021

(65) Prior Publication Data
US 2023/0024969 A1   Jan. 26, 2023

(51) Int. Cl.
| | |
|---|---|
| *H04N 21/466* | (2011.01) |
| *H04N 21/45* | (2011.01) |
| *H04N 21/4722* | (2011.01) |
| *H04N 21/475* | (2011.01) |
| *H04N 21/845* | (2011.01) |
| *H04N 21/8549* | (2011.01) |

(52) U.S. Cl.
CPC ..... *H04N 21/4532* (2013.01); *H04N 21/4755* (2013.01); *H04N 21/8456* (2013.01); *H04N 21/8549* (2013.01)

(58) Field of Classification Search
CPC ................ H04N 21/4532; H04N 21/4755
See application file for complete search history.

(56) References Cited

U.S. PATENT DOCUMENTS

| | | | |
|---|---|---|---|
| 10,917,704 B1 * | 2/2021 | Hamid | H04N 21/4725 |
| 2010/0251295 A1 * | 9/2010 | Amento | H04N 21/485 725/38 |
| 2018/0359530 A1 * | 12/2018 | Marlow | H04N 21/4394 |
| 2020/0068274 A1 * | 2/2020 | Aher | H04N 21/8456 |
| 2020/0128294 A1 * | 4/2020 | Gupta | H04N 21/44222 |
| 2023/0097683 A1 * | 3/2023 | Liu | H04N 21/8549 386/241 |

* cited by examiner

*Primary Examiner* — Hsiungfei Peng
(74) *Attorney, Agent, or Firm* — HALEY GUILIANO LLP (57) ABSTRACT

Provided are systems and methods for generating a customized summary of content for a user using a co-relation graph and a user preference. The co-relation graph maps, for each segment of the content, summary information of the segment and a characteristic of the segment. The system identifies, using the co-relation graph, a subset of the segments of the content based on the user preference and the characteristics of the segments. The customized summary of the content is generated based on the summary information for the identified subset of segments. The system may also use a current presentation time of the content to limit which segments are used to generate the summary. The system can also use a priority ranking to exclude summary information from less important segments to keep the summary within a desired size.

20 Claims, 6 Drawing Sheets

METHODS AND SYSTEMS FOR GENERATING A SUMMARY OF CONTENT BASED ON A CO-RELATION GRAPH

BACKGROUND

The present disclosure is directed to providing a summary of content to a user. More particularly, the present disclosure is directed to selecting segments of content based on a co-relation graph and user preferences.

SUMMARY

Summaries of content can be useful to a user before they select content or while they are in the middle of consuming the content. If a user is trying to select content to consume, a summary can help them decide if they would be interested in the content. These summaries are often generic and template based. A generic summary may skip over characteristics of the content that a user may be interested in. For example, a user may enjoy romantic plots but the summary of an action movie may not show the romantic subplot. The user may then believe that they would not enjoy the content. Presenting a personalized summary based on user preferences makes it more likely that a user will select the content. If a user has already started the content, a summary can help by providing a recap of previous segments so that the user can remember important parts of a plotline. Recaps of previous segments are also often generic and template-based. These generic recaps are not very useful to the user. For example, a user may pause a show because they forgot the context behind the scene they are currently watching. A generic recap may lack the relevant information. A personalized summary based on user preferences allows a user to see segments relevant to them.

This disclosure describes systems and methods that generate a summary of content based on a user preference and a co-relation graph. The co-relation graph maps segments of the content to other segments based on summary information and characteristics of the segment. The systems and methods disclosed can identify segments of the content based on user preferences and how segments are related to each other in the co-relation graph. The system then generates a summary of the content based on the summary information for the identified segments.

The system and methods determine a user preference for content. In some embodiments, the system may monitor the content consumption habits of the user to determine the user's preferences. In some embodiments, the user may manually enter their preferences. For example, a user may prefer certain actors, characters, genres, locations, any other characteristics of a show or movie, and/or any combination thereof.

The system and methods (e.g., implemented using control circuitry) access a co-relation graph that maps segments of the content to other segments based on summary information and characteristics of the segment and identifies a subset of segments based on user preferences. For example, summary information may include characters, actions, locations, any other suitable characteristics of segments, and/or any combination thereof. For example, characteristics of the segment may include actors, characters, genres, locations, any other characteristics of a show or movie, and/or any combination thereof. The co-relation graph maps segments with related characteristics. For example, a first segment may include characters A and B, a second segment may include characters B and C, and a third segment may include only character C. The co-relation graph may show that while character A is not in the second segment, characters B and C discuss character A in the second segment, and therefore character A is impacted by the second segment. Therefore, the co-relation graph would identify that segment 2 relates to character A. If the control circuitry identifies that the user prefers character A, it would identify segments 1 and 2, but not segment 3.

The control circuitry may also use a current presentation time of the content to identify segments of the content. The current presentation time of the content indicates where in the content the user has watched up to. In some embodiments, the control circuitry chooses only segments that occurred before the current presentation time of the content to give the user a recap of previously watched segments. In some embodiments, the control circuitry may also use a priority ranking to identify segments of the content. For example, segments with a greater impact on the overall plot may have a higher priority ranking than segments that do not impact the plot. The control circuitry may determine that the aggregate summary information of the identified segments is longer than a size threshold. The control circuitry may then use the priority ranking to identify summary information corresponding to segments having low priority. In some suitable approaches, the control circuitry may remove segments with a priority ranking below a threshold in order to shorten the generated summary. If the generated summary is still too long, the control circuitry may raise the priority threshold and remove more summary information until the desired length is reached. In some suitable approaches, the control circuitry may add in segments with a lower priority ranking if the generated summary is determined to be shorter than a size threshold.

Once the co-relation graph identifies segments of the content, control circuitry generates a summary of the content based on the summary information for the identified segments. The control circuitry then generates the summary for presentation. In some embodiments, the control circuitry generates the summary for presentation at a user device, such as a smartphone device, tablet, personal computer, or television set.

BRIEF DESCRIPTION OF THE DRAWINGS

The above and other objects and advantages of the present disclosure will be apparent upon consideration of the following detailed description, taken in conjunction with the 8 accompanying drawings, in which like reference characters refer to like parts throughout, and in which.

DETAILED DESCRIPTION

Content includes any suitable content that can be consumed by a user. For example, content can include video, audio, text, graphics, any other suitable form of content, or any combination thereof. Illustrative content could be a movie, a television program series, an episode of a television program, a song, a music album, an audio book, a podcast or any other suitable content item. A segment of content is any suitable portion of content, delineated from the remainder of the content in any suitable way. In some embodiments, a segment may be a scene (or portion of a scene) of a movie or of a television program, an episode of a multi-episode show, content corresponding to a plot arc within a movie or television program (or any portion thereof), any other suitable portion of content, an audio track (or a portion thereof, such as a chorus portion of a song), any suitable audio portion of a movie or television program, and/or any combination thereof.

Figure 1:
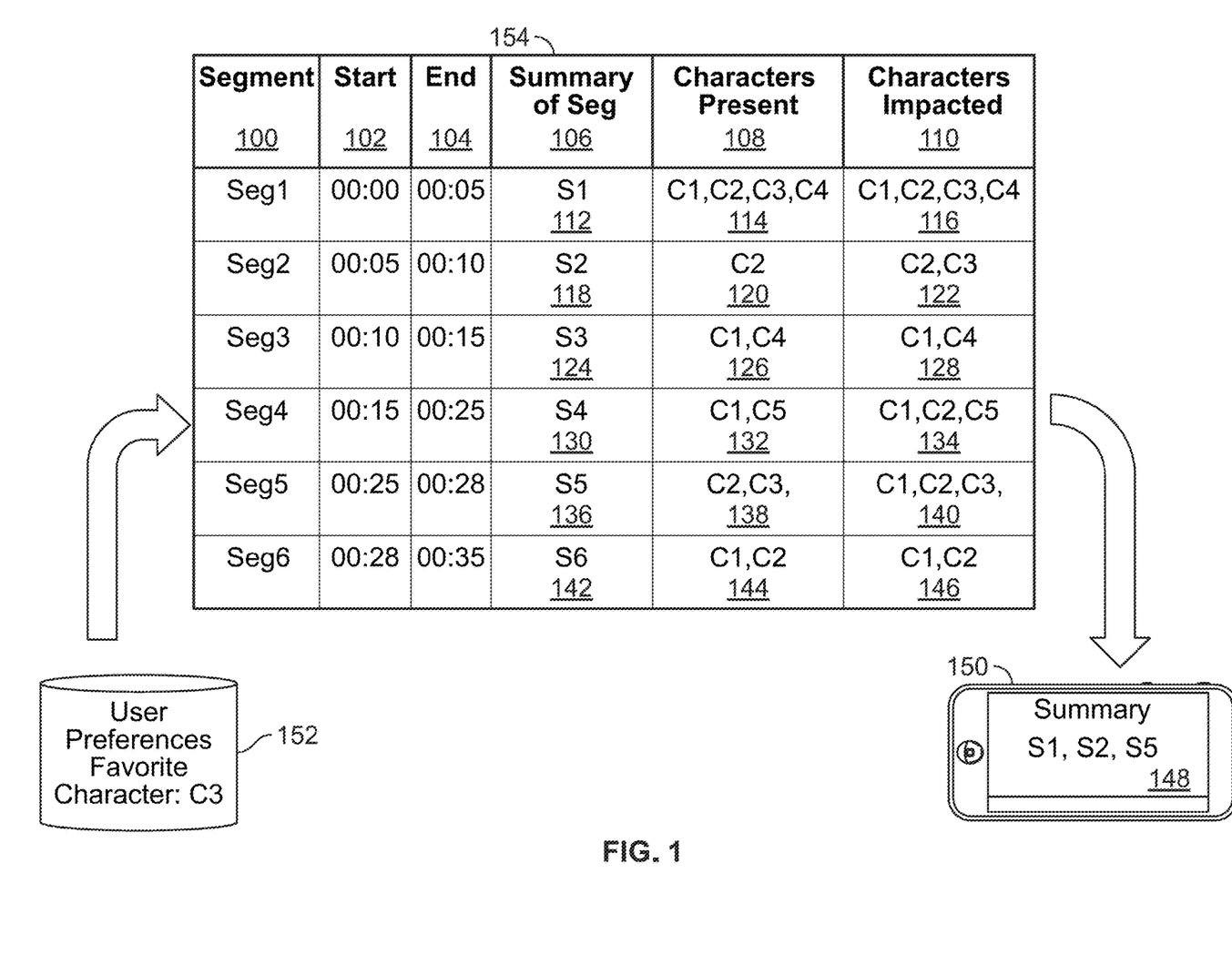
FIG. 1 shows an illustrative example of generating a summary of content based on a co-relation graph, in accordance with some embodiments of the disclosure.

FIG. 1 shows an illustrative example of generating a summary 148 of content based on a co-relation graph 154 and user preferences 152, in accordance with some embodiments of the disclosure. The summary 148 is displayed on user device 150. The user device 150 can be a smartphone as illustrated, or a TV, personal computer, any other suitable device for consuming content, and/or any combination thereof. In some embodiments, the system can generate the summary of content before the user has consumed the content. In this way, the summary acts can act as a customized preview. The summary 148 as illustrated is a summary of segments of the content chosen based on user preferences 152. In some embodiments, the system can generate the summary of content while the user is consuming the content (e.g., when a user pauses the content) or after the user has already viewed the content (e.g., to refresh the user's memory before the user views related content, such as a next episode in a series).

The co-relation graph 154 maps segments of content to characteristics of those segments of content. Characteristics of segments may include characters present, characters impacted, genre, geographic location, any other suitable characteristic, and/or any combination thereof. Exemplary co-relation graph 154 as illustrated maps the characteristics of characters present 108 and characters impacted 110 to the segments 100 of content defined by the start and end times 102 and 104. In some embodiments, the number and length of segments 100 can be determined based on the length of the content. For example, if the length of each segment 100 is set to 5 minutes and the content is 30 minutes long, then there would be 6 segments in co-relation graph 154. In some embodiments, the number and length of segments 100 can be determined based on the content. For example, a different segment 100 can be created for each content segment, scene, plotline, location, any other suitable portion of content, and/or any combination thereof. The co-relation graph 154 also maps each segment 100 of content to a respective summary of the segment 154. For example, summary S2 may provide a segment summary of what character C2 is doing during the segment and information relevant to impacted character C3, who is not present during the segment.

The user preferences database 152 stores user preferences. User preferences can include favorite characters, actors, genres, geographic locations, any other suitable preferences, and/or any combination thereof of the user. In some embodiments, the system may monitor the content consumption habits of the user to determine the user's preferences. In some embodiments, the user may manually enter their preferences. For example, the user can enter into a user device 150 that they prefer character C3. The user preferences may be stored locally on user device 150, or any other user device, such as on user computer equipment 504 of FIG. 5. The user preferences may also be stored remotely, such as on a cloud-based server, such as in the media guidance data source 518 in FIG. 5. Storage is described in more detail below in reference to FIGS. 4 and 5.

In the exemplary co-relation graph 154, each segment has a summary 106 and two segment characteristics: characters present 108 and characters impacted 110. A character may not be present in a segment, but still be impacted by the events in it. For example, other characters may talk about the character, something may happen that will be a part of the plotline for the character, any other suitable actions that will impact the character may occur, and/or any combination thereof. For example, in the exemplary system of FIG. 1, character C3 is both present in and impacted by segments 1 and 5, since C3 is found at 114/116 and 138/140, but C3 is not present in nor impacted by segments 3, 4 and 6, so C3 is not found at 126/128, 132/134, and 144/146. In addition, C3 is impacted in segment 2 but is not present, so C3 is found at 122, but not 120.

When a user requests a summary at the user device 150, the system can use the co-relation graph 154 to generate a customized summary for the user based on the user's preferences. In FIG. 1, the user preferences 152 for the user indicate that the user's favorite character is C3. In some embodiments, the system identifies segments in the co-relation graph 154 where character C3 is impacted (i.e., uses characters impacted 110 information) to generate the customized summary. C3 is found at 116, 122, and 140 but not at 128, 134, or 146, so the system identifies segments 1, 2, and 5. C3 is impacted in segment 2 but is not present, so C3 is not found at 120. The system then generates summary 148 from the identified segments and presents it at user device 150. In some embodiments, the system identifies segments in the co-relation graph 154 where character C3 is present (i.e., uses characters present 108 information) to generate the customized summary. If the system of FIG. 1 were to use characters present in the segment as the characteristic for identifying segments, then summary 148 would contain summary information for only segments S1 and S5.

Figure 2:
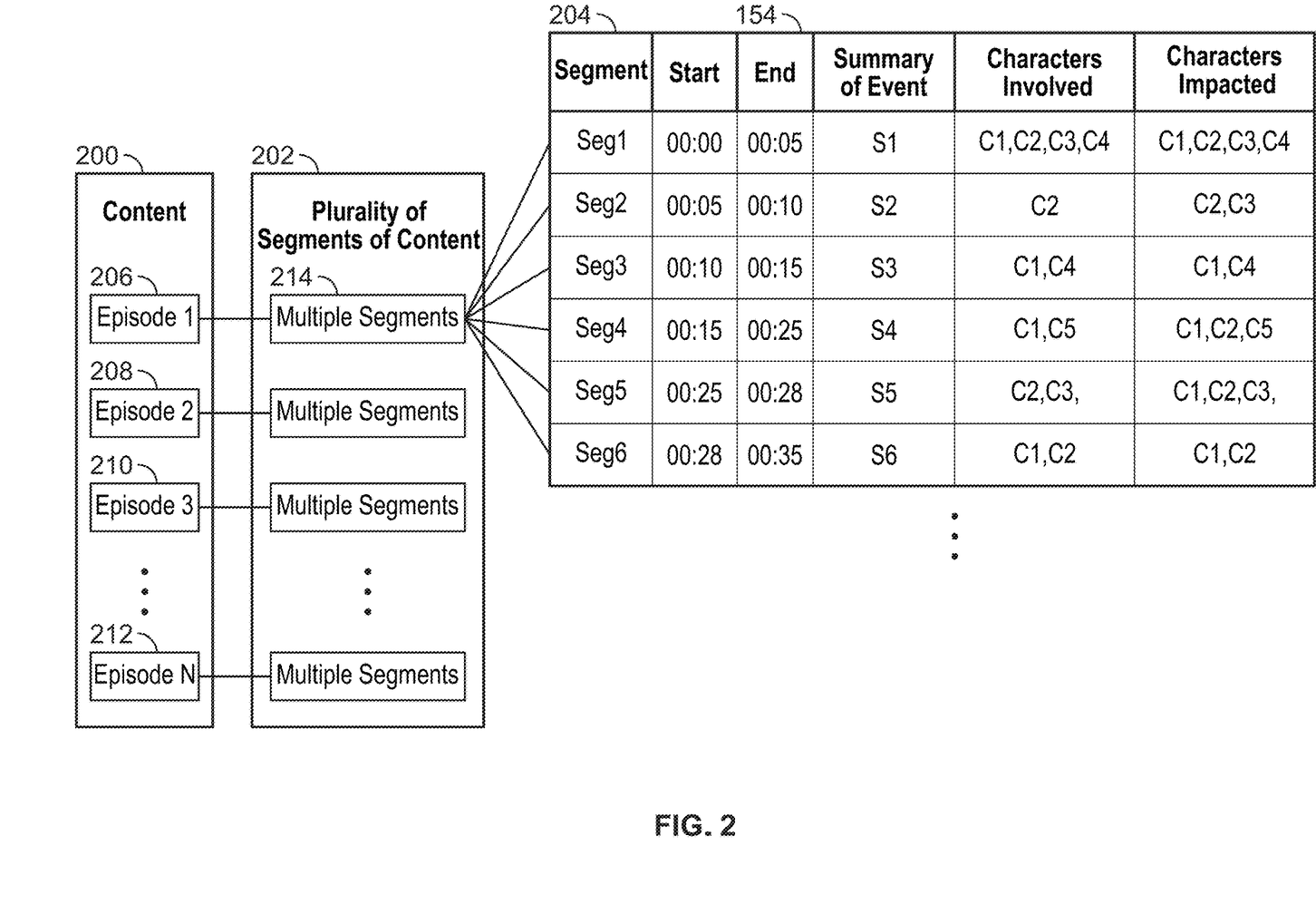
FIG. 2 shows an illustrative example of generating a co-relation graph, in accordance with some embodiments of the disclosure.

FIG. 2 shows an illustrative example of generating a co-relation graph, in accordance with some embodiments of the disclosure. The content 200 as illustrated contains N number of episodes 206, 208, 210, and 212. In some embodiments, the system determines multiple segments for each of the episodes' content. In some embodiments, the segments are of equal length. For example, the system can identify eight 15-minute segments for content that is 2 hours long. In some suitable approaches, the number of segments is based on the length of the content. For example, while the system can identify eight 15-minute segments for content that is 2 hours long, the system can identify six 5-minute segments for content that is 30 minutes long. In some embodiments, the system can determine segments of different lengths. For example, the system can identify three segments that are 10 minutes, 14 minutes, and 6 minutes long for content that is 30 minutes long. In some suitable approaches, these segments are determined based on story arcs. For example, each segment may impact a plot or subplot. In some suitable approaches, the segments correspond to segments of the content.

The co-relation graph 154 maps each of the segments of the multiple segments to summary information and characteristics to create a co-relation graph. For example, the co-relation graph 154 maps the segments 204 corresponding to the multiple segments 214 of Episode 1 to the summary information and characteristic information. It will be understood that co-relation graph 154 of FIG. 2 includes additional rows of content for the additional episodes of the content. It will also be understood that a co-relation graph can be used for a single content item such as a movie or episode or multiple content items such as for a series of episodes.

Figure 3:
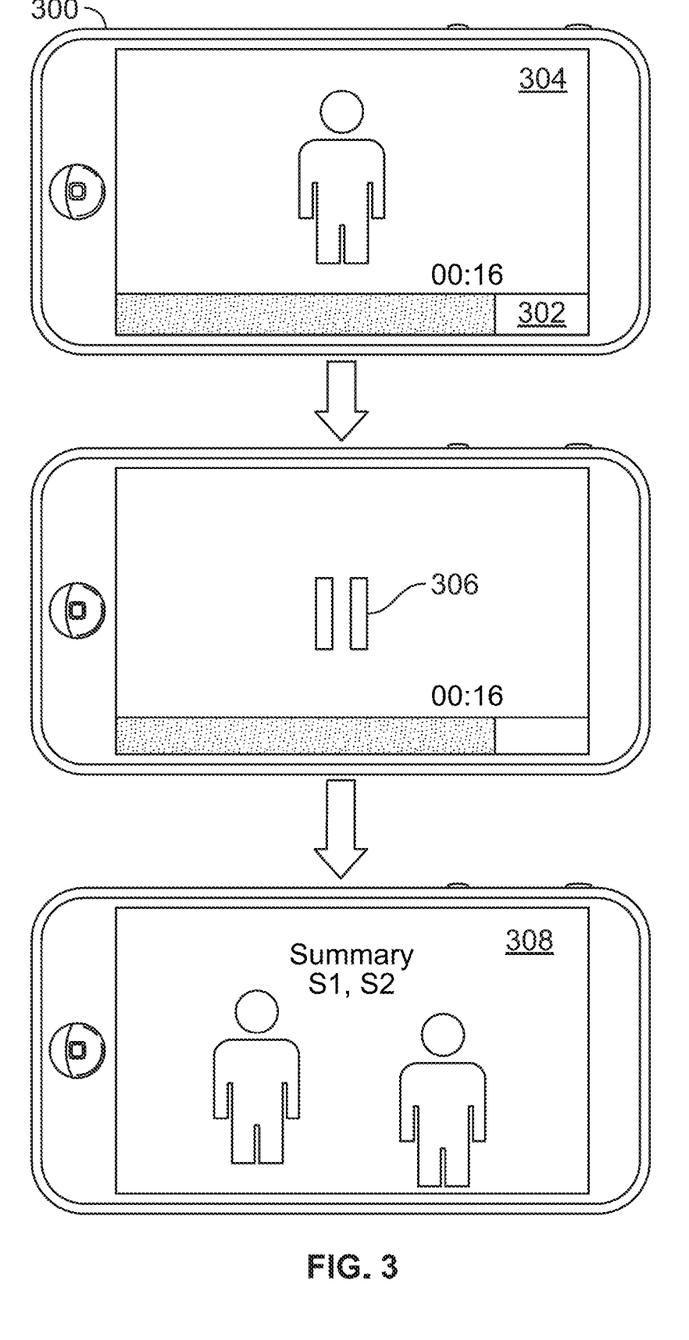
FIG. 3 shows an illustrative example of generating a summary of content using a current presentation time, in accordance with some embodiments of the disclosure.

FIG. 3 shows an illustrative example of generating a summary 308 of content using a current presentation time, in accordance with some embodiments of the disclosure. The summary 308 is displayed on user device 300. For example, in FIG. 3 the user requests a summary of the content up until the current presentation time, which is found in the progress bar 302. The current presentation time can be determined based on the user's watching history. This watch history can be stored locally on the user device 300 or remotely (e.g., at the media guidance data source 518 of FIG. 5).

In some embodiments, the system generates the summary based on a user input, which may indicate a request for a summary of content. For example, a user can indicate that they would like the system to generate a summary by stopping the content. In some suitable embodiments, the user may indicate a request for a summary by stopping the video, pausing the video, any suitable halting of the video, and/or any suitable combination thereof. For example, the user may select the pause button 306. The user in FIG. 3 has watched the content 304 on the user device 300 up to 00:16 and requests a summary of the content up to that point in time (i.e., the current presentation time) based on their preferences.

The system generates summary 308, using a co-relation graph and the user preferences, and presents it on the user device 300. The user in FIG. 3 prefers character C3, just as the user did in FIG. 1. However, whereas summary 148 of FIG. 1 contains summary information S1, S2, and S5, summary 308 contains only summary information S1 and S2. The system in FIG. 3 determines that segment 5 takes place after the current presentation time 00:16 found in progress bar 302. So, even though segment 5 matches the user preference, the system does not identify it. Therefore, the system generates summary 308 with just the summary information from segments 1 and 2. The system generates the summary for display at the user device.

Figure 4:
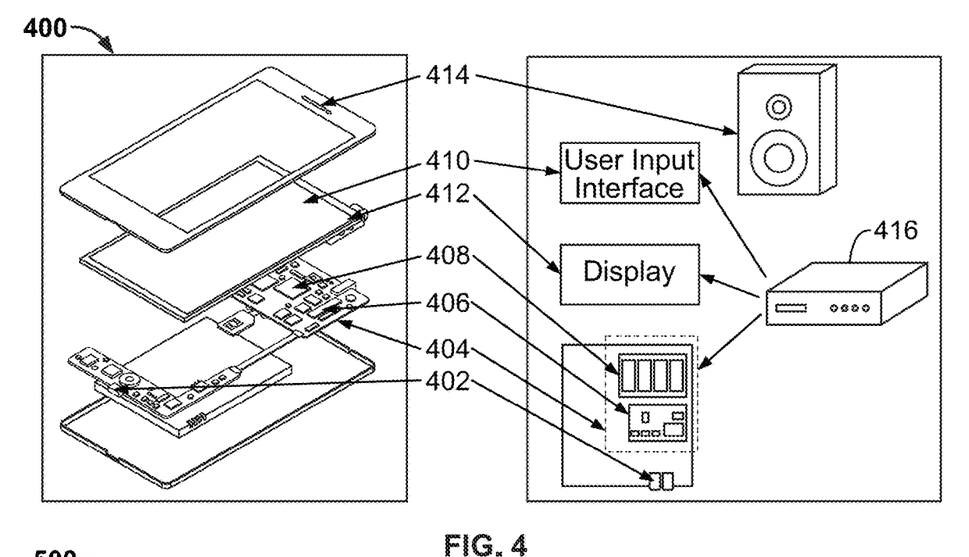
FIG. 4 is a block diagram of an illustrative media system in accordance with some embodiments of the present disclosure.

FIG. 4 shows generalized embodiments of illustrative user equipment device 400. In some embodiments, user equipment device 400 may be a smartphone device, remote control, any other suitable device, and/or any combination thereof. In another example, user equipment system 400 may be a user television equipment system. User television equipment system 400 may include a set-top box 416. Set-top box 416 may be communicatively connected to speaker 414 and display 412. In some embodiments, display 412 may be a television display or a computer display. In some embodiments, set top box 416 may be communicatively connected to user interface input 410. In some embodiments, user interface input 410 may be a remote-control device. Set-top box 416 may include one or more circuit boards. In some embodiments, the circuit boards may include control circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 5. Each one of user equipment device 400 and user equipment system 400 may receive content and data via input/output (hereinafter "I/O") path 402. I/O path 402 may provide content (e.g., broadcast programming, on-demand programming, Internet content, content available over a local area network (LAN) or wide area network (WAN), segments of content, characteristics of the segments, summary information of the segments, user preferences and/or other content) and data to control circuitry 404, which includes control circuitry 406 and storage 408. Control circuitry 404 may be used to send and receive commands, requests, and other suitable data using I/O path 402. I/O path 402 may connect control circuitry 404 (and specifically control circuitry 406) to one or more communications paths (described below). I/O functions may be provided by one or more of these communications paths but are shown as a single path in FIG. 4 to avoid overcomplicating the drawing.

Control circuitry 404 may be based on any suitable control circuitry such as control circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408), such the content consumption system. Specifically, control circuitry 404 may be instructed by the content consumption system to perform the functions discussed above and below. For example, the content consumption system may provide instructions to control circuitry 404 to generate the segments, summary information of the segments, characteristics of the segments, and user preferences, including indicators and contextual information. In some implementations, any action performed by control circuitry 404 may be based on instructions received from the content consumption system. In client-server based embodiments, control circuitry 404 may include communications circuitry suitable for communicating with a content consumption system server or other networks or servers. The instructions for carrying out the above-mentioned functionality may be stored on the content consumption system server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as segments, summary information of the segments, characteristics of the segments, and user preferences described above. Nonvolatile memory may also be used (e.g., to launch a boot-up routine and other instructions). Cloud-based storage, described in relation to FIG. 5, may be used to supplement storage 408 or instead of storage 408. Control circuitry 404 may include video-generating circuitry and tuning circuitry, such as one or more analog tuners, one or more MPEG decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for up-converting and down-converting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive segments, summary information of the segments, characteristics of the segments, and user preferences. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 404. User input interface 404 may be any suitable user interface, such as a remote control, mouse, 30 trackball, keypad, keyboard, touchscreen, touchpad, stylus input, joystick, voice recognition interface, or other user input interfaces. Display 412 may be provided as a stand-alone device or integrated with other elements of each one of user equipment device 400 and user equipment system 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thinfilm transistor display, organic light-emitting diode display, surface-conduction electronemitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D segments and 2D graphics, MPEG-2/MPEG-4 decoding, TV output, or the ability to connect multiple monitors. The video card may be any control circuitry described above in relation to control circuitry 404. The video card may be integrated with the control circuitry 404. Speakers 414 may be provided as integrated with other elements of each one of user equipment device 400 and user equipment system 400 or may be stand-alone units. The audio component of videos and other content displayed on display 412 may be played through speakers 414. In some embodiments, the audio may be distributed to a receiver (not shown), which processes and outputs the audio via speakers 414.

The content consumption system may be implemented using any suitable architecture. For example, it may be a stand-alone application wholly implemented on each one of user equipment device 400 and user equipment system 400. In such an approach, instructions of the content consumption system are stored locally (e.g., in storage 408), and data for use by the content consumption system is downloaded on a periodic basis (e.g., from an out-of-band feed, from an Internet resource, or using another suitable approach). Control circuitry 404 may retrieve instructions of the content consumption system from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the content consumption system is a client-server based application. Data for use by a thick or thin client implemented on each one of user equipment device 400 and user equipment system 400 is retrieved on-demand by issuing requests to a server remote to each one of user equipment device 400 and user equipment system 400. In one example of a client-server based content consumption system, control circuitry 404 runs a web browser that interprets web pages provided by a remote server. For example, the remote server may store the instructions for the content consumption system in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the content consumption system corresponding to the input (e.g., a display that moves a cursor up/down). The generated display is then transmitted to equipment device 400 for presentation to the user. In some embodiments, the content consumption system is downloaded and interpreted or otherwise run by an interpreter or virtual machine (run by control circuitry 404). In some embodiments, the content consumption system may be encoded in the ETV Binary Interchange Format (EBIF), received by control circuitry 404 as part of a suitable feed, and interpreted by a user agent running on control circuitry 404. For example, the content consumption system may be an EBIF application. In some embodiments, the content consumption system may be defined by a series of JAVA-based files that are received and run by a local virtual machine or other suitable middleware executed by control circuitry 504. In some of such embodiments (e.g., those employing MPEG-2 or other digital media encoding schemes), the content consumption system may be, for example, encoded and transmitted in an MPEG-2 object carousel with the MPEG audio and video packets of a program.

Figure 5:
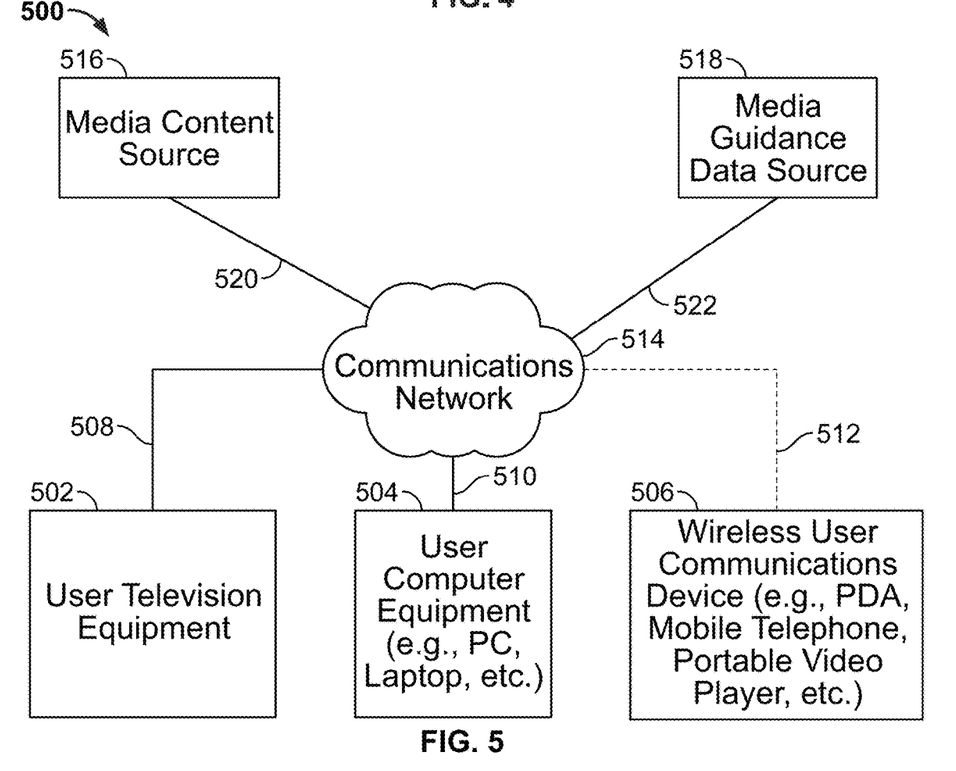
FIG. 5 is a block diagram of an illustrative user equipment device in accordance with some embodiments of the present disclosure.

Each one of user equipment device 400 and user equipment system 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which the content consumption system may be implemented, may function as a standalone device or may be part of a network of devices. Various network configurations of devices may be implemented and are discussed in more detail below. A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The content consumption system may have the same layout on various different types of user equipment or may be tailored to the display capabilities of the user equipment. For example, on user computer equipment 504, the content consumption system may be provided as a website accessed by a web browser. In another example, the content consumption system may be scaled down for wireless user communications devices 506. In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G, 5G, or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short range point-to-point communication paths, such as USB cables, IEEE 1394 cables, wireless paths (e.g., Bluetooth, infrared, IEEE 302-11x, etc.), or other short-range communication via wired or wireless paths. BLUETOOTH is a certification mark owned by Bluetooth SIG, INC. The user equipment devices may also communicate with each other directly through an indirect path via communications network 314.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512. Media guidance data source 518 may contain a metadata database.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or need not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices.

Media guidance data source 518 may provide metadata, including contextual information for respective audio/video content objects provided by content source 516. Metadata may be provided to the user equipment devices using any suitable approach. In some embodiments, the content consumption system may be a stand-alone application that receives metadata via a data feed (e.g., a continuous feed or trickle feed). Metadata and other data may be provided to the user equipment on a television channel sideband, using an in-band digital signal, using an out-of-band digital signal, or by any other suitable data transmission technique. Metadata and other data may be provided to user equipment on multiple analog or digital television channels.

In some embodiments, metadata from media guidance data source 518 may be provided to user equipment using a client-server approach. For example, a user equipment device may pull metadata from a server, or a server may push metadata to a user equipment device. In some embodiments, a content consumption system client residing on the user's equipment may initiate sessions with source 518 to obtain metadata when needed, such as when the local metadata is out of date or when the user equipment device receives a request from the user to receive data. Metadata may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the content consumption system itself or software updates for the content consumption system. Metadata can include the co-relation graph, segment characteristics, segment summary information, user preferences, any other suitable information for identifying segments, and/or any combination thereof.

Applications may be, for example, stand-alone applications implemented on user equipment devices. For example, the content consumption system may be implemented as software or a set of executable instructions which may be stored in storage 408 and executed by control circuitry 404 of each one of user equipment device 400 and user equipment system 400. In some embodiments, applications may be client-server applications where only a client application resides on the user equipment device, and a server application resides on a remote server. For example, applications may be implemented partially as a client application on control circuitry 404 of each one of user equipment device 400 and user equipment system 400 and partially on a remote server as a server application (e.g., media guidance data source 518) running on control circuitry of the remote server. When executed by control circuitry of the remote server (such as media guidance data source 518), the content consumption system may instruct the control circuitry to generate the content consumption system displays and transmit the generated displays to the user equipment devices. The server application may instruct the control circuitry of the media guidance data source 518 to transmit data for storage on the user equipment. The client application may instruct control circuitry of the receiving user equipment to generate the content consumption system displays.

Content and/or metadata delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP need not be responsible for the viewing abilities, copyrights, or redistribution of the content, and, in one suitable approach, only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide metadata described above. In addition to content and/or metadata, providers of OTT content can distribute applications (e.g., web-based applications or cloud-based applications), or the content can be displayed by applications stored on the user equipment device.

System 500 is intended to illustrate a number of approaches, or network configurations, by which user equipment devices and sources of content and metadata may communicate with each other for the purpose of accessing content and providing respective contextual information. The embodiments described herein may be applied in any one or a subset of these approaches, or in a system employing other approaches for delivering content and providing contextual information.

For example, in one suitable approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more metadata sources 518. In addition, or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having a content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, an application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by control circuitry described in relation to FIG. 4.

Figure 6:
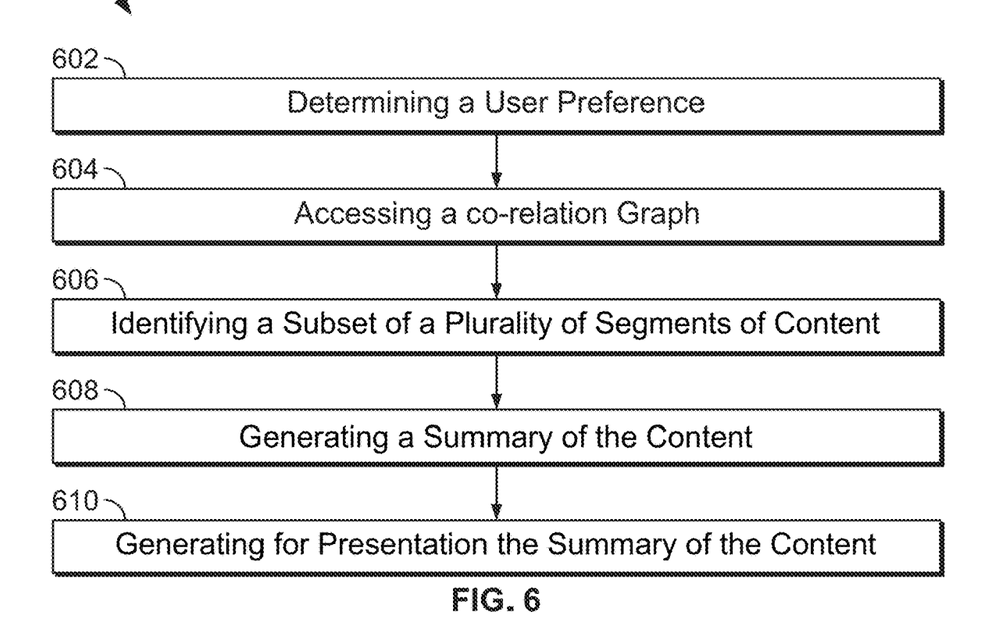
FIG. 6 is a flowchart of illustrative steps for generating a summary of content from user preferences, in accordance with some embodiments of the disclosure.

FIG. 6 is a flowchart of an illustrative process for generating a summary of content from user preferences, in accordance with some embodiments of the disclosure. In some embodiments, process 600 may be executed by control circuitry 404 of FIG. 4. It should be noted that process 600 or any steps thereof could be performed on, or provided by, the system of FIGS. 4 and 5 or any of the devices shown in FIGS. 1 and 3. Also, one or more steps of process 600 may be incorporated into or combined with one or more steps of any other process or embodiment herein.

Process 600 begins at step 602. At step 602, the control circuitry determines a user preference. In some embodiments, the user preference is determined by retrieving the user preference from memory. The user preference may be for a favorite actor, character, genre, geographic location, any other suitable content preference, and/or any combination thereof. In some embodiments, the system may monitor the content consumption habits of the user to determine the user's preferences. In some embodiments, the user may manually enter their preferences. For example, a user may prefer certain actors, characters, genres, locations, any other characteristics of a show or movie, and/or any combination thereof. These user preferences may be stored remotely or locally at the user device.

At step 604, the control circuitry accesses a co-relation graph. The co-relation graph maps segments of the content to summary information for the segments and characteristics of the segments. The summary information for each segment may include, for example, a summary of the plots of the segments, such as a description of what happened to the characters in the segment. The characteristics of the segment may include, for example, actors, characters, genres, locations, any other characteristics of a show or movie, and/or any combination thereof. In some embodiments, the characteristics may not necessarily match but are related in some way. For example, a first segment may include characters A and B, a second segment may include characters B and C, and a third segment may include only character C. The co-relation graph may show that while character A is not in the second segment, characters B and C discuss character A in the second segment and therefore character A is impacted by the second segment.

At step 606, the control circuitry identifies a subset of a plurality of segments of content. The control circuitry uses the user preferences and the characteristics of the segments from the co-relation graph to identify the segments. In some embodiments, the system may identify the segments by finding a match between a user preference and the characteristic of a segment. In some embodiments, the system may use multiple user preferences and characteristics to identify matches.

At step 608, the system generates a personalized summary of the content. This personalized summary contains the summary information from the co-relation graph of the identified segments. The summary may be assembled at a remote server or at a local user device. At step 610, the control circuitry generates for presentation the summary of the content. For example, the summary is presented to the user on a display of a user device.

Figure 7:
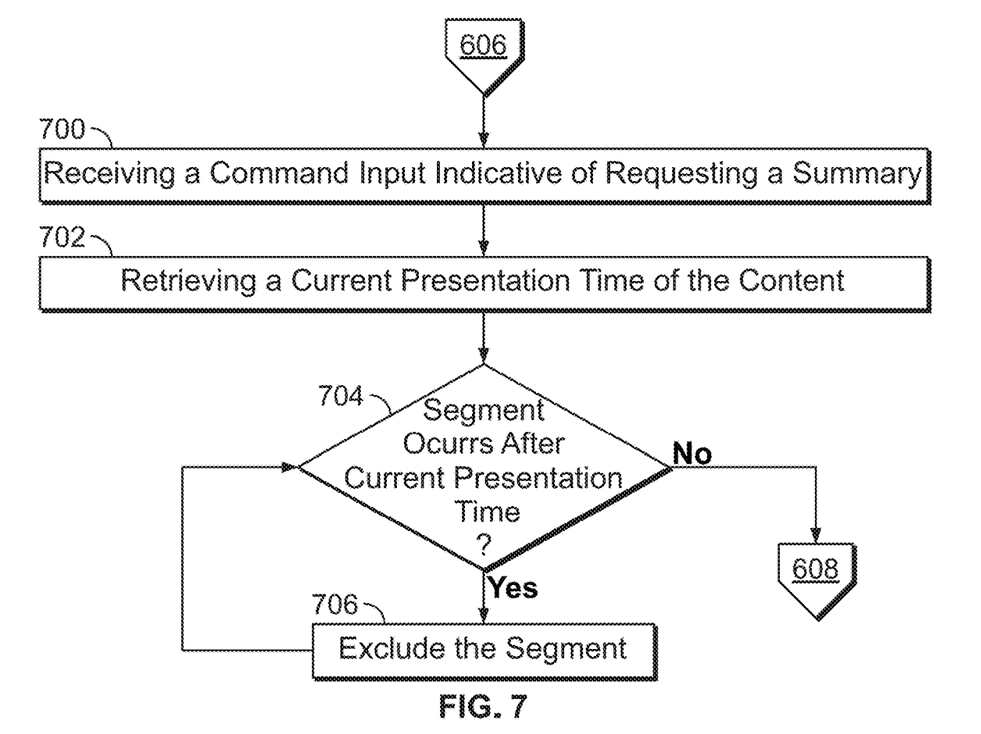
FIG. 7 is a flowchart of illustrative steps for generating a summary of content using a current presentation time, in accordance with some embodiments of the disclosure.

FIG. 7 is a flowchart of illustrative steps for generating a summary of content using a current presentation time, in accordance with some embodiments of the disclosure. In some embodiments, the flowchart of FIG. 7 is executed by control circuitry to implement step 606 of FIG. 6

The flowchart of FIG. 7 begins at step 700, where control circuitry receives a user input indicative of requesting a summary of content. In some suitable embodiments, the user may indicate a request for a summary by stopping the content, pausing the content, any suitable halting of the content, and/or any suitable combination thereof. In some suitable embodiments, the user may indicate a request for a summary by selecting a menu option that indicates more information regarding the content.

Once the control circuitry receives the input, the system receives a current presentation time of the content at step 702. A watch history may include information on how much of content a user has consumed. This information may include a counter for the number of episodes into a series or a timer of how far into content a user has consumed. For example, it may show how far into an episode, series, movie, any other content, and/or any suitable combination a user has consumed. The system may determine the current presentation time from the user's watch history. The user's watch history may be stored on a remote server or locally on the user device. In some suitable embodiments, the system may use the watch history to determine how much of the content the user wants a summary of. For example, if a user is three episodes into a series of ten episodes, the system may determine that the user wants a summary of all three previously viewed episodes.

The control circuitry makes a determination at 704 regarding whether a segment of a co-relation graph occurs after the current presentation time. In some embodiments, the system compares the start time of a segment and the current presentation time to determine if the segment occurs after or before the current presentation time. In some embodiments, the system compares the end time of a segment and the current presentation time to determine if the segment occurs after or before the current presentation time.

At step 706, if the segment occurs after the current presentation time, the system excludes the segment from being identified and reenters step 704 to check more segments. Once all the segment start times or end times are checked against the current presentation time, the system enters step 606 to generate the summary from summary information for the identified segments.

The flowchart of FIG. 7 can be used to prevent spoiler information from being presented to the user in a summary. It will be understood that steps 704 and 706 can be implemented in any suitable approach to exclude segments after the current presentation time from being included in a summary. For example, steps 704 and 706 can be applied to segments identified at step 606 of FIG. 6. As another example, steps 704 and 706 can be applied to the co-relation graph, and then the segments of the co-relation graph that were not excluded are used to identified segments. As another example, steps 704 and 706 can exclude segments by only including segments having start or end times that are before the current presentation time. In some embodiments, the segments of the co-relation graph are analyzed sequentially until a segment is found that is after the current presentation time. Then, that segment and the remaining segments of the co-relation graph are excluded.

Figure 8:
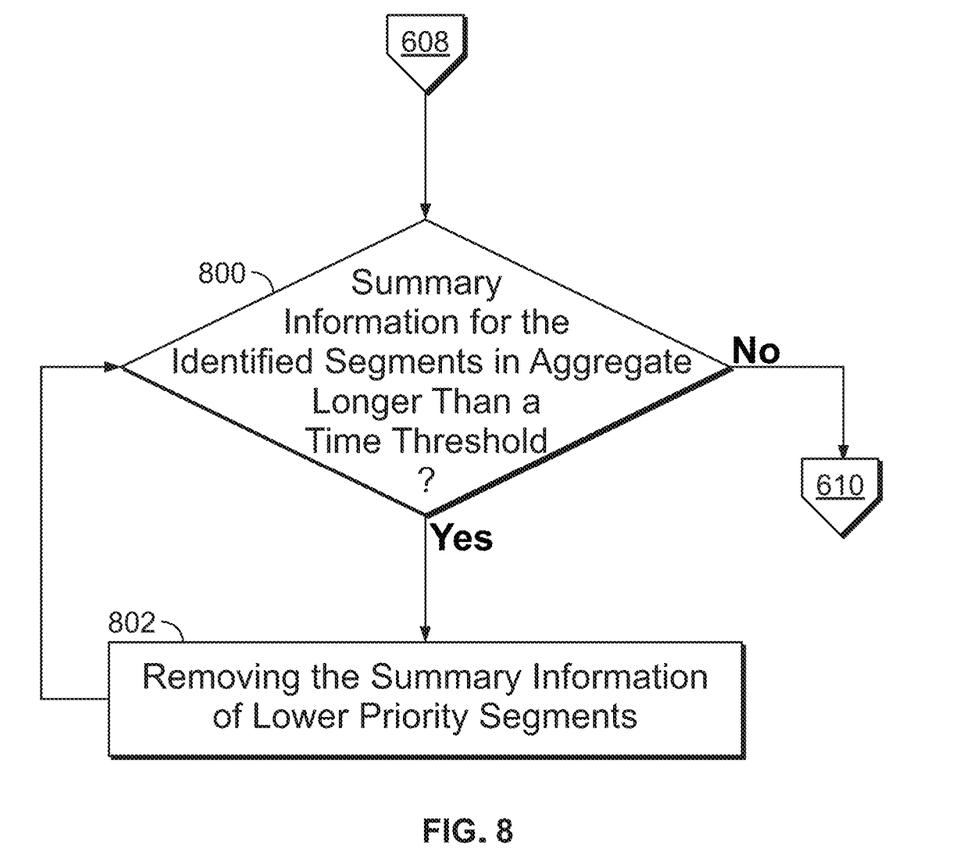
FIG. 8 is a flowchart of illustrative steps for removing segments from a summary that is longer than a size threshold, in accordance with some embodiments of the disclosure.

FIG. 8 is a flowchart of illustrative steps for removing segments from a summary that is longer than a size threshold, in accordance with some embodiments of the disclosure. In some embodiments, the co-relation graph additionally contains priority ratings. The priority ratings may be determined by the segment's importance, favorability ratings, any other suitable measure of priority, and/or any combination thereof. After the control circuitry generates a summary (e.g., at step 608 of FIG. 6), the control circuitry can make a determination 800 of whether the summary information, in aggregate, is longer than a size threshold (e.g., in number of characters, words, or time if the summary is audio or video). In some embodiments, the size threshold may be a predetermined size value that restricts the length of the summary. For example, the system may restrict all summaries to be less than 100 words or 30 seconds long. For example, the user may be given the option of manually selecting different lengths of summary, such as 10 seconds, 30 seconds, and 1 minute long or 50 words, 100 words, and 150 words long. When the summary information is longer than the size threshold, then, at step 802, the summary information of lower priority segments is removed to reduce the size of the total summary information. This may be repeated until the size threshold is satisfied. Once the size threshold is satisfied, the control circuitry proceeds to generate the summary information for presentation (e.g., at step 610 of FIG. 6). In some suitable approaches, the user may view a summary and then indicate a request for an expanded summary with a longer size threshold. In some embodiments, the size threshold may be dynamic. For example, a user may be scrolling through options for content and then increase the speed of scrolling. The system can change from longer summaries to shorter ones as the user scrolls faster.

As referred to herein, the phrase "in response" should be understood to mean automatically, directly and immediately as a result of, without further input from the user, or automatically based on the corresponding action where intervening inputs or actions may occur.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
   determining a user preference;
   accessing a co-relation graph comprising a mapping between each segment of a plurality of segments of content, summary information of the segment, and an indication of at least one character impacted by, but not present in, events of the segment;
   identifying, using the co-relation graph, a subset of the plurality of segments of the content based at least in part on the user preference and the indications of at least one character impacted by, but not present in, the events of the plurality of segments, wherein the identifying excludes segments having a start time after a current presentation time of the content;
   generating an aggregate summary of the content based at least in part on the summary information for the identified subset of segments;
   generating, for presentation, the content;
   receiving an input that causes the presentation of the content to stop; and
   generating, for presentation while the presentation of the content is stopped, the aggregate summary of the content based at least in part on receiving the input that causes the presentation of the content to stop, wherein the aggregate summary excludes summary information for the segments having a start time after the current presentation time of the content.

2. The method of claim 1, wherein identifying the subset of the plurality of segments of the content is further based on a current presentation time of the content.

3. The method of claim 2, wherein
each segment of the plurality of segments of the content has a start time and an end time.

4. The method of claim 1, wherein the user preference comprises a favorite actor, character, genre, or geographic location.

5. The method of claim 1, wherein the co-relation graph also maps, for each segment of the plurality of segments of content, at least one of an actor in the segment, a character in the segment, a genre of the segment, or a geographic location associated with the segment.

6. The method of claim 1, wherein the co-relation graph also maps, for each segment of a plurality of segments of content, a priority ranking, the method further comprising:
determining that the summary information for the identified subset of segments, in aggregate, is longer than a size threshold; and
based at least in part on determining that the summary information is longer than the size threshold, removing the summary information corresponding to one or more of the identified subset of segments based on the priority ranking of the plurality of segments of content to generate the aggregate summary of the content.

7. The method of claim 1, wherein:
the user preference comprises a plurality of user preferences; and
each segment of the identified subset of segments has a mapping to at least two of (i) an actor in the segment, (ii) a character in the segment, (iii) a character impacted by, but not present in, the events of the segment, (iv) a genre of the segment, or (v) a geographic location associated with the segment that match a respective actor, character, genre, or geographic location of the plurality of user preferences.

8. The method of claim 1, wherein the content comprises a plurality of episodes and each episode of the plurality of episodes comprises multiple segments of the plurality of segments of the content.

9. The method of claim 1, wherein:
each of the plurality of segments of content represents a time interval of the content; and
the sum of the lengths of the time intervals are equal to the length of the content.

10. The method of claim 1, wherein:
the summary information of the segments comprises a description of what happened to a character in the segment; and
the aggregate summary of the content is based on the description of what happened to a character in the identified subset of segments.

11. A system comprising:
control circuitry configured to:
determine user preference;
access a co-relation graph comprising a mapping between each segment of a plurality of segments of content, summary information of the segment, and an indication of at least one character impacted by, but not present in, events of the segment;
identify, using the co-relation graph, a subset of the plurality of segments of the content based at least in part on the user preference and the indications of at least one character impacted by, but not present in, the events of the segment of the plurality of segments, wherein the identifying excludes segments having a start time after a current presentation time of the content;
generate an aggregate summary of the content based at least in part on the summary information for the identified subset of segments;
generate, for presentation, the content;
receive an input that causes the presentation of the content to stop; and
generate, for presentation while the presentation of the content is stopped, the aggregate summary of the content based at least in part on receiving the input that causes the presentation of the content to stop, wherein the aggregate summary excludes summary information for the segments having a start time after the current presentation time of the content.

12. The system of claim 11, wherein the control circuitry is further configured, when identifying the subset of the plurality of segments of the content, to further base the identifying on a current presentation time of the content.

13. The system of claim 11, wherein
each segment of the plurality of segments of the content has a start time and an end time.

14. The system of claim 11, wherein the user preference comprises a favorite actor, character, genre, or geographic location.

15. The system of claim 11, wherein the co-relation graph also maps, for each segment of the plurality of segments of content, at least one of an actor in the segment, a character in the segment, a genre of the segment, or a geographic location associated with the segment.

16. The system of claim 11, wherein the co-relation graph also maps, for each segment of a plurality of segments of content, a priority ranking, and wherein the control circuitry is further configured to:
determine that the summary information for the identified subset of segments, in aggregate, is longer than a size threshold; and
based at least in part on determining that the summary information is longer than the size threshold, remove the summary information corresponding to one or more of the identified subset of segments based on the priority ranking of the plurality of segments of content to generate the aggregate summary of the content.

17. The system of claim 11, wherein:
the user preference comprises a plurality of user preferences; and
each segment of the identified subset of segments has a mapping to at least two of (i) an actor in the segment, (ii) a character in the segment, (iii) a character impacted by, but not present in, the events of the segment, (iv) a genre of the segment, or (v) a geographic location associated with the segment that match a respective actor, character, genre, or geographic location of the plurality of user preferences.

18. The system of claim 11, wherein the content comprises a plurality of episodes and each episode of the plurality of episodes comprises multiple segments of the plurality of segments of the content.

19. The system of claim 11, wherein:
each of the plurality of segments of content represents a time interval of the content; and
the sum of the lengths of the time intervals are equal to the length of the content.

20. The system of claim 11, wherein:
the summary information of the segments comprises a description of what happened to a character in the segment; and the aggregate summary of the content is based on the description of what happened to a character in the identified subset of segments.

* * * * *